United States Patent [19]

Davies et al.

[11] 3,961,037
[45] June 1, 1976

[54] PROCESS FOR FORMING HYDROGEN AND CARBON DIOXIDE USING A CATALYST CONSISTING ESSENTIALLY OF OXIDES OF COPPER, ZINC AND ALUMINUM OR MAGNESIUM

[75] Inventors: Phineas Davies; Alan James Hall, both of Norton-on-Tees, England

[73] Assignee: Imperial Chemical Industries Limited, London, England

[22] Filed: Nov. 27, 1973

[21] Appl. No.: 419,298

Related U.S. Application Data

[63] Continuation of Ser. No. 483, Jan. 2, 1970, abandoned, which is a continuation of Ser. No. 513,112, Dec. 10, 1965, abandoned.

[30] Foreign Application Priority Data

Jan. 5, 1965   United Kingdom................... 482/65

[52] U.S. Cl................................ 423/656; 423/437; 252/463; 252/475; 252/476; 252/373
[51] Int. Cl.$^2$...................... C01B 1/02; C01B 1/08; C01B 2/06; C01B 31/20
[58] Field of Search............................ 423/656, 437

[56]   References Cited
   UNITED STATES PATENTS

| | | | |
|---|---|---|---|
| 1,797,426 | 3/1931 | Larson | 423/656 |
| 3,303,001 | 2/1967 | Dienes | 423/656 |
| 3,388,972 | 6/1968 | Reitmeier et al. | 423/652 |
| 3,514,261 | 5/1970 | Bridger et al. | 423/437 |

FOREIGN PATENTS OR APPLICATIONS

| | | | |
|---|---|---|---|
| 636,800 | 5/1950 | United Kingdom | 423/656 |
| 961,860 | 6/1964 | United Kingdom | 423/656 |

*Primary Examiner*—Edward Stern
*Attorney, Agent, or Firm*—Cushman, Darby & Cushman

[57]   ABSTRACT

A process for reacting carbon monoxide with steam at temperatures below 300°C. over a catalyst comprising the product of reducing partly the co-precipitated oxides of copper and zinc and at least one further metal selected from the metals of Groups II to V of the Periodic Table whose oxides are usable as catalyst supports.

5 Claims, No Drawings

PROCESS FOR FORMING HYDROGEN AND CARBON DIOXIDE USING A CATALYST CONSISTING ESSENTIALLY OF OXIDES OF COPPER, ZINC AND ALUMINUM OR MAGNESIUM

This is a continuation of abandoned application Ser. No. 483, filed Jan. 2, 1970, which is itself a continuation of abandoned Ser. No. 513,112, filed Dec. 10, 1965.

This invention relates to the reaction of carbon monoxide with steam over catalysts of high activity at low temperature. The catalysts in preferred forms have the advantage of remaining active for longer periods of use, or of being less dense without serious loss of mechanical strength, than many previously known related catalysts.

According to the invention there is provided a process for reacting carbon monoxide with steam at temperatures below 300°C. over a catalyst comprising the co-precipitated oxides of copper and zinc and at least one further metal selected from the metals of Groups II to V of the Periodic Table whose oxides are usable as catalyst supports.

The invention provides also a catalyst composition from which the catalyst can be made and a method for making the composition and catalyst. The further metal is preferably a metal from Group II or Group III of the Periodic Table particularly aluminium or magnesium, although titanium or zirconium or thorium can be used. The proportion of the oxide of the further metal is preferably in the range 4 to 20 especially 8 to 20% by atoms of the total of the oxides mentioned.

The copper content of the catalyst or composition is preferably at least 10% for example in the range 10 to 70% especially 10–15%. The zinc content is preferably at least 20%, for example between 20% and 80%. Thus suitable catalysts contain copper, zinc and the further metal or metals in the ratios 30:60:10, 40:40:20 and 60:30:10 and ratios intermediate of these ratios. These proportions are also by atoms.

The invention also provides a method of making the catalyst composition in which a mixture of non-halide sulphur-free salts of the metals is reacted with a carbonate or bicarbonate of an alkali metal or (less preferably) an ammonium, whereafter the resulting precipitate is washed substantially free of alkali, dried and calcined. The mixing of the solutions in the precipitation stage is preferably performed continuously. The temperature of the mixing stage is preferably in the range 65° to 85°C., and preferably it is raised to 80° to 100°C. after mixing and kept there until the pH ceases to rise. Preferably a fairly low but constant degree of alkalinity (corresponding to a pH at 90°C. in the range up to 9.0 especially up to 8.0) is maintained during and after the precipitation. The washing of the precipitate, if made using an alkali metal compound, should preferably be so as to leave less than 0.5% of alkali metal oxide (calculated as $Na_2O$), more preferably less than 0.2%.

In the above method it is preferred that at least some and preferably all the content of each metallic constituent introduced by precipitation should be introduced as a compound in which it is present as cations especially as nitrate or acetate. It is however within the scope of the invention to introduce part of one or more metallic constituents an anions. The calcination of the catalyst is preferably at temperatures up to 350°C. for example about 300°C.

If the catalyst is to be used in a static bed it can be formed into shapes for example granulation, pelleting or extrusion. These operations are carried out preferably after calcining the precipitate. The pellet density of the composition is preferably in the range 1.0 to 2.0 especially 1.4 to 1.8. Before being brought into use the catalyst composition is reduced to give the active form; and this is usually done by the user of the catalyst in the converter in which it is to be used. Reducing gases such as hydrogen or carbon monoxide, preferably substantially diluted with a gas inert to the catalyst such as nitrogen or stream, can be used for the reduction provided they are substantially free of sulphur and other catalyst poisons. A suitable reduction temperature is 230°: excessive temperatures should of course be avoided.

The catalyst composition according to the invention preferably contains a proportion of catalyst support material additional to that which is introduced by co-precipiation. Suitably this material is the same as that introduced by co-precipitation, although it need not be. Preferably the major proportion of catalyst support material is introduced by co-precipitation. An especially good catalyst contains 2 to 8% w/w of added alumina, and this has preferably been added in the form of an alumina hydrate or a hydratable alumina to one or more of the solutions taking part in the co-precipitation, so that precipitation takes place in its presence. The catalyst composition according to the invention may if desired contain a proportion of chromium oxide, preferably up to about 25% of the total composition, and this is preferably introduced by co-precipitation. Both the above-mentioned percentages are by weight on the oxides present in the catalyst composition when in the oxide form.

In the process for reacting carbon monoxide with steam the catalyst is deactivated by excessive temperatures, hence the process is operated at temperatures up to 300°C. Pressures over a wide range, for example 1 to 50 atmospheres and higher, can be used. The inlet gas should be substantially sulphur free, that is, contain less than 5, especially less than 1 part per million by weight of sulphur free or combined, hence it is expedient to protect the catalyst by means of a sulphur-absorbing bed or other "guard case", conveniently one operative at the inlet temperature of the catalyst. The process of the invention is very conveniently used to treat a gas mixture whose CO content has been decreased (e.g. to less than 5%) over a catalyst (such as iron oxide or a molybdate) which is effective at higher temperatures. Such two-stage carbon monoxide conversion systems are already well known. The process of the invention can be used in conjunction with known process steps for adjusting the steam concentration and temperature and for removing carbon dioxide.

The process of the invention is particularly applicable in the production of ammonia synthesis gas or hydrogen or in the removal of carbon monoxide from fuel gas in order, for example, to decrease its toxicity.

The invention is illustrated by the following Examples.

EXAMPLE 1

A solution (4 liters) of cupric nitrate trihydrate (0.694 kg.), zinc nitrate hexahydrate (1.323 kg.) and aluminum nitrate nonahydrate (0.853 kg.) in water was mixed continuously at 74°C. with a solution (20 liters) of sodium carbonate (3.4 kg. as $Na_2CO_3$). The rates of flow during the mixing were such as to afford a small excess of alkali, corresponding to a slurry pH of 7.0 to 7.5. The whole slurry was then diluted with 10 liters of water, heated to 90°C. and held there for 1 hour. It was observed that as a result of this heat-treatment the pH of the slurry rose to 8.4. The precipitate was collected on a filter, re-slurried with 20 liters of water, then collected again and washed with 30 liters of water. The filter cake was dried at 120°C. calcined at 300°C. for 8 hours, then finely powdered. A sample of it was pelleted with 2% of graphite to give 3/16 × 3/16 inch cylindrical pellets. The percentage composition of the pellets by weight was as follows:

```
CuO      28.6
ZnO      44.5
Al₂O₃    12.5
Loss at 900° 15.1 (includes volatiles
and graphite).
```

This corresponds to an atomic ratio of 35% copper, 53% zinc and 12 % aluminum. The pellets had a mean vertical crushing strength of 369 pounds, a pellet density of 1.91 and a bulk density of 1.2.

A sample of the composition was tested as pellets by reducing it with dilute hydrogen (1.5% $H_2$, 98.5% $N_2$) at 230°C. A catalyst containing only copper and zinc (34 : 66 by moles respectively) and having a mean vertical crushing strength of 150 pounds, a pellet density of 2.46 and a bulk density of 1.5 was tested in the same way. The activity of the catalysts at 240°C., expressed as rate constants based on the rate of destruction or carbon monoxide, is given in the Table: the values in brackets are percentages of initial activity.

TABLE 1

| Time (hours) | Activity ($sec^{-1}$) Cu — Zn — Al | Cu — Zn |
|---|---|---|
| 0 | 7.8 (100) | 12.5 ( 100) |
| 100 | 7.3 (93.5) | 10.2 (81.5) |
| 300 | 7.0 (89.8) | 8.4 (67.2) |
| 500 | 6.6 (84.6) | 7.5 (60.0) |
| 1000 | 5.9 (75.6) | 6.5 (52.5) |

A second sample of the filter cake was pelleted with 2% of graphite but using a lower pelleting pressure. The mean vertical crushing strength of these pellets was 150 pounds and their density was 1.66. When tested in the same way as the higher density catalyst the following activities were recorded.

TABLE 2

| Time (hours) | Activity ($sec^{-1}$) |
|---|---|
| 0 | not available |
| 23 | 7.8 |
| 100 | 7.6 |
| 300 | 6.8 |
| 500 | 6.8 |

EXAMPLE 2

The procedure of Example 1 was followed with the exception that 0.256 kg. of magnesium nitrate hexahydrate was used in place of the aluminium nitrate and minor changes were made in the washing of the precipitate. Under the conditions used, magnesium is not completely precipitated, and as a result the magnesium content of the catalyst was less than the aluminium content of the catalyst of Example 1. The percentage composition of the catalyst was

```
CuO     30.5
ZnO     52.3
MgO     3.0
Loss at 900°C. 14.4 (includes volatiles and
graphite).
```

This corresponds to an atomic ratio of 34.9% copper, 58.4% zinc and 6.7% magnesium. The pellets had a mean vertical crushing strength of 162 pounds, a pellet density of 1.66 and a bulk density of 1.11.

In order to test this catalyst the pellets were crushed to pass a 17 B.S.S. sieve but to be retained on a 25 B.S.S. sieve and then reduced by means of a mixture of hydrogen (1.5% by volume) and nitrogen at 230°C. There was then passed over the reduced catalyst a mixture of steam (50%), carbon monoxide (25%) and hydrogen (25%), with a dry gas space velocity of 18000 $hr^{-1}$.

The activity of the catalyst in reciprocal second units at 240°C. was as given in Table 3.

TABLE 3

| Time (hours) | Activity ($sec^{-1}$) |
|---|---|
| 0 | 10.0 |
| 100 | 8.5 |
| 300 | 6.8 |

EXAMPLE 3

To a solution of copper nitrate trihydrate (1.04 kg.), zinc nitrate hexahydrate (2.56 kg.) and concentrated nitric acid (400 ml.) in 3 liters of water there were added 0.19 kg. of sodium aluminate in 600 ml. water. Alumina was precipitated but redissolved on stirring. Then 0.075 kg. of finely divided solid alumina trihydrate was added. The resulting suspension was mixed at a flowing junction with a sodium carbonate solution sufficient to give a pH of 7.0 to 8.0 at the precipitation temperature which was 70°C. The slurry was diluted with 6 liters of water, heated at 90°C. for 1 hour (final pH 8.5), then filtered. The washing, calcining and pelleting procedure were as described in Example 1. The pellets (5.4 mm. diameter, 3.6 mm. long) had a mean vertical crushing strength of 187 lbs., a pellet density of 1.56 and a bulk density of 0.99. The percentage composition of the pellets was

```
CuO     22.2
ZnO     47.0
Al₂O₃   10.7    (7.2 by precipitation, 3.6 added
                    solid)
Na₂O    0.11
Loss at 900°C. 19.4
```

This corresponds to an atomic ratio of 29% copper, 60% zinc, 11% aluminium.

The pellets were crushed and tested as described in Example 2. At 200°C. the conversion was 32% and at 250°C. 51%.

We claim:

1. In a process wherein carbon monoxide and steam are reacted by contacting the same with a catalyst at a temperature below 300°C to form hydrogen and carbon dioxide, the improvement which comprises carrying out said reaction with a catalyst consisting essentially of the reduced co-precipitated oxides of copper, zinc and at least one metal selected from the group consisting of aluminum and magnesium, said co-precipitated oxides being obtained by reacting a mixture of non-halides, sulphur-free, water-soluble salts of copper, zinc and the other metal in aqueous solution with a compound of the group consisting of ammonium carbonate, ammonium bicarbonate, an alkali metal carbonate and an alkali metal bicarbonate whereby the copper, zinc and other metal are co-precipitated after which the resulting co-precipitate is washed substantially free of soluble salts, dried and calcined; said catalyst containing, on the basis of the total number of metal atoms present, from 10 – 70% copper, 4 – 20% other metal, balance essentially zinc in an amount of at least 20%, and the amount of oxide of said other metal being such that the activity of the catalyst is stabilized so that said activity is maintained at an increased level for a longer period of time than for a similar catalyst without said oxide of other metal.

2. A process according to claim 1 in which in the catalyst the proportion of the other metal or metals is in the range 8 to 20% by atoms based on the total number of metal atoms present.

3. A process according to claim 2 in which in the catalyst the proportion of copper is in the range 20 to 70% by atoms based on the total number of metal atoms present.

4. A process according to claim 2 in which in the catalyst the proportion of zinc is in the range of 20 – 80% and the other metal is aluminum.

5. A process according to claim 1 in which the catalyst contains, in addition to the metals and oxides introduced by co-precipitation 2 to 8% of alumina introduced as an alumina hydrate or a hydratable alumina.

* * * * *